(12) United States Patent
Dussinger (10) Patent No.: US 6,981,441 B1
(45) Date of Patent: Jan. 3, 2006

(54) FRESH BREWED ICE BEVERAGE DISPENSING SYSTEM

(76) Inventor: Kenneth Dussinger, 138 Walnut Hill Rd., Woonsocket, RI (US) 02895

( * ) Notice: Subject to any disclaimer, the term of this patent is extended or adjusted under 35 U.S.C. 154(b) by 35 days.

(21) Appl. No.: 10/405,731

(22) Filed: Apr. 2, 2003

Related U.S. Application Data (60) Provisional application No. 60/369,855, filed on Apr. 5, 2002.

(51) Int. Cl.
*A23F 1/28* (2006.01)
(52) U.S. Cl. .............................. 99/434; 99/435; 99/433; 99/432
(58) Field of Classification Search ................ 426/435, 426/434, 433, 431, 425, 597, 432
See application file for complete search history.

(56) References Cited

U.S. PATENT DOCUMENTS 5,116,632 A * 5/1992 Miller ........................ 426/597
5,858,437 A * 1/1999 Anson ........................ 426/431
6,203,837 B1 * 3/2001 Kalenian .................... 426/432
6,231,907 B1 * 5/2001 Kino et al. .................. 426/131

* cited by examiner

*Primary Examiner*—Reginald L. Alexander (57) ABSTRACT

A Method and Integrated system for brewing and dispensing beverages that must be brewed hot but are dispensed cold, such as coffee, tea and the like, is disclosed. The system comprises a dual purpose brewer adapted to both brew a hot concentrate and accept chilled water for cooling and dilution. The system allows for a hot beverage to be brewed directly into a containing vessel at room temperature. A hot brew concentrate at a temperature of approximately 180 degrees Fahrenheit is effectively lowered to 70 to 90 degrees during the brew stage. The vessel may next be immediately sealed, purged of oxygen, then provided to a standard manifold feeding multi-tap dispensing system. Subject invention eliminates any oxidation and exposure to the elements that would occur if the hot brewed beverage were allowed to be cooled and stored in an open container.

10 Claims, 7 Drawing Sheets

FRESH BREWED ICE BEVERAGE DISPENSING SYSTEM

CROSS-REFERENCE TO RELATED APPLICATIONS

This application claims the benefit of U.S. Provisional Application No. 60/369,855 filed 5 Apr. 2002.

FIELD OF THE INVENTION

This application relates to an integrated system for brewing and dispensing beverages that must be brewed hot but are desirably dispensed cold, such as iced coffee and tea.

BACKGROUND OF THE INVENTION

Current practice in preparation of iced coffee and tea is to prepare a concentrated hot product, which is diluted with tap water to reach the proper concentration, and then poured over ice to cool it. This dilutes the product and damages its flavor, and requires significant quantities of ice, as well as operator attention. Further, in many cases the beverage is exposed to the atmosphere through storage in open containers, with the attendant possibility of spoilage, growth of bacteria, and the like; in particular, exposure to oxygen is the primary cause of the loss of flavor and "freshness".

OBJECTS AND SUMMARY OF THE INVENTION

An object of the present invention is to provide an integrated system for the efficient and convenient brewing and delivery of beverages that are brewed hot and then chilled without dilution through pouring over ice and without exposure to the atmosphere.

A detailed presentation by the inventor, entitled "Java Tap-Iced Coffee Dispensing System", which details various embodiments of the invention, was provided as part of Provisional Application No. 60/369,855 and is included in the following section entitled "Description of the Preferred Embodiment". As detailed further therein, the object of the invention mentioned above is met in any of several embodiments thereof.

In the following, coffee is used as an example, but with the understanding that other brewed beverages and various types of each can be similarly prepared.

Hot, concentrated coffee is brewed directly into a stainless steel vessel fitted with a lid capable of containing pressure of up to 130 psi. The concentrate is diluted in this vessel, preferably with water chilled to approximately 36 degrees Fahrenheit delivered from a remote chilling station; the same chilling station can be used to chill the coffee prior to dispensing to the consumer, and to supply chilled water or glycol for chilling other components of the system, or other beverage systems at the same location. In the event chilled water is not available, tap water can also be used to chill the concentrate, but further chilling will then be necessary. After brewing, the vessel is removed from the brewer.

When the coffee has been chilled approximately to room temperature, the lid is closed, and the vessel connected to a supply tube, typically connected as part of a manifold feeding multiple tap dispensers. The vessel is also connected to a source of pressurized nitrogen; a purge valve is opened for a few seconds, to purge air containing oxygen from the head space in the vessel, preventing loss of freshness due to oxidation. Thereafter, the nitrogen also serves to motivate flow of the coffee through the piping to the dispenser.

Further chilling of the coffee is accomplished at a chilling station between the vessel and the dispensing tap. This can be accomplished in a variety of ways, e.g., by piping the supply line through a separate refrigeration unit or ice bin, by incorporating a chilling device in the dispensing unit, or further combinations of these and related devices. Furthermore, applicant asserts that independent tests have concluded that coffee in a vessel the head space of which is filled with nitrogen and stored at room temperature does not support the growth of *C. botulinum*, the microorganism which causes botulism.

BRIEF DESCRIPTION OF THE DRAWINGS

The invention is best understood from the following detailed description when read in connection with the accompanying drawings

DESCRIPTION OF THE PREFERRED EMBODIMENTS

Figure 1:
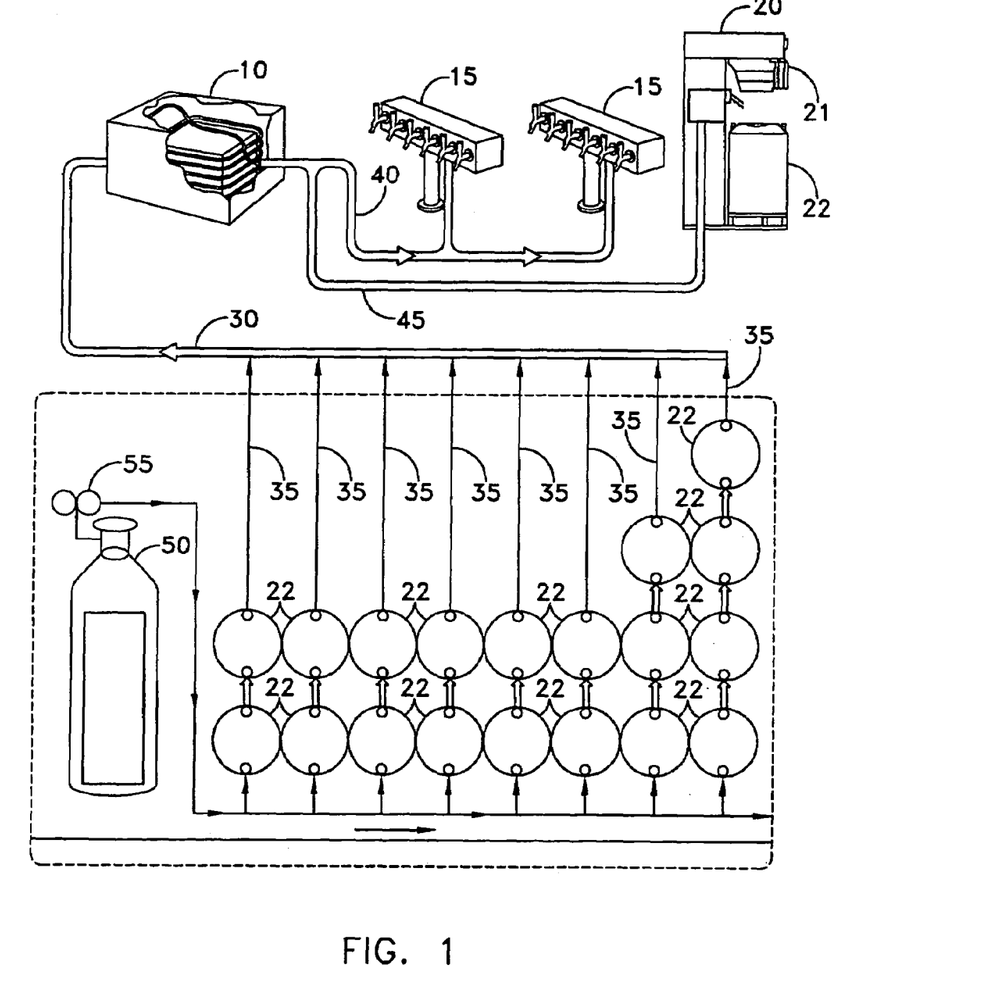
FIG. 1 depicts the preferred embodiment of subject invention utilizing a multi-purpose refrigeration-chilling unit.
Figure 7:
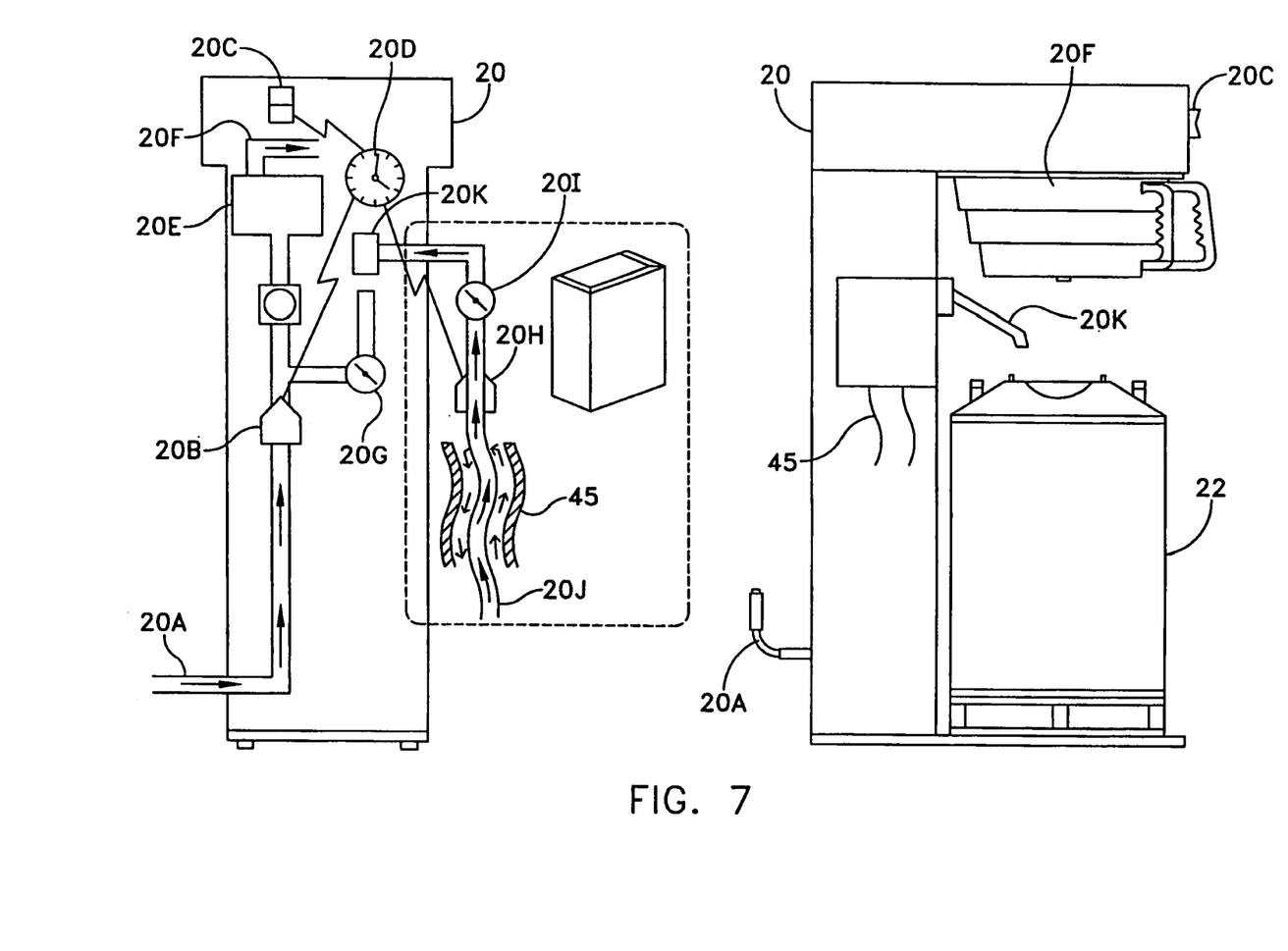
FIG. 7 depicts the internal components of a Bunn IC-3 Brewer with modifications of subject invention indicated within dotted lines.

Referring to FIG. 1, the preferred embodiment of subject brewing system is disclosed comprising a multi-purpose refrigeration chilling unit 10, dispensing taps 15, brewer 20, and multi-tap dispensing system 25. Brewer 20 is a brewer known in the art, such as a Bunn IC-3, that has been modified for integration with subject invention. The brewer 20 functions by spraying hot water over tea leaves or coffee grounds placed in the brew basket 21, thereby producing a strong concentrate that drips into a dispensing vessel 22. The dispensing vessel 22 is a stainless steel vessel fitted with a lid capable of containing pressure of up to 130 PSI, and is suitable for use in multi-tap dispensing system 25, such as IMI Cornelius 3 Gallon Stainless Steel Product Tank, Model # 1011437. Referring to FIG. 7, the internal components of Bunn IC-3 Brewer are disclosed. Filtered tap water enters Brewer 20 through tubing 20A to a solenoid 20B. When Brew Start Button 20C is activated timer 20D opens solenoid valve 20B allowing the tap water to pass to a hot water tank 20E. As the Tap water enters the hot water tank 20E, it displaces any preheated water in the tank, pushing it to the brew head 20F. An adjustable flow valve 20G is used to bypass an amount of tap water to dispensing vessel 22 of FIG. 1 for dilution of the concentrated coffee.

FIG. 7 depicts within dotted lines brewer 20 modifications for subject invention. These modifications require flow valve 20G to be closed during normal operation. A new solenoid valve 20H and controlling flow valve 20I are added and interfaced to existing brew timer 20D to control the flow of chilled water from chilling station 10 to brewer 20. A water supply line 20J is connected from chilling station 10 to the solenoid valve 20H, via a water supply connection to the exterior housing of the brewing unit 20. The supply line 20J is encased in insulated conduit 45 to reduce condensation and carries a circulating supply and return of prechilled water at a constant temperature of 36 to 40 degrees Fahrenheit. Timer 20D allows for the simultaneous control of the opening and closing of solenoid 20B and 20H. When the brew timer is activated both solenoid 20H (for dilution and first stage of chilling) and solenoid 20B (for brewing) allow for simultaneous water supply. The chilled water flow from solenoid 20H is controlled by adjusting flow valve 20I. The output of flow valve 20I provides chilled water to dispensing vessel 22 through spigot output 20K and mixes with the hot brew beverage concentrate contained therein thereby lowering the temperature of the beverage (first stage of chilling). A hot brew beverage concentrate at a temperature of approximately 180 degrees Fahrenheit is effectively lowered to approximately 70 to 90 degrees Fahrenheit after this first stage of chilling. Valve 20I is adjusted to the proper volume of water necessary for dilution of the concentrated brew beverage and to replace a volume of water from ice that was previously used for cooling in the prior art. Solenoid 20B operates to allow tap water to pass to hot water tank 20E for brewing.

The multi-purpose refrigeration unit 10, such as Multiplex Model 150 Beermaster Glycol Chiller, known in the art, has been conventionally used for delivering chilled soda and beer to remote service stations. Cold refrigerant from the compressor compartment of refrigeration unit 10 is pumped through the copper coils located around the inside walls of a cooling bath tank. This forms a wall of ice around four inches thick around the bath tank. In the center of the ice bath there is an agitator to keep the water circulating through the coils for optimal chilling. Also in the center of the ice bath are the "s" shaped copper coils. These "s"-shaped coils are used for cooling either water or a product called glycol. For the purpose of maintaining the temperature of the prechilled beverage lines, glycol or water is pumped through them. It is also routed through the insulated conduit 40 which contains multiple beverage lines and insulated conduit 45 which contains the chilled water line for the first stage of chilling. This coolant is continually pumped to and from dispensing stations 15 and brewer 20, resulting in a constant in line temperature of around 36 degrees.

At the conclusion of the first stage of chilling the beverage contained in dispensing vessel 22 is at approximately room temperature or approximately 70–80 degrees Fahrenheit. At this temperature the vessels 22 can be immediately sealed so as to eliminate oxidation and exposure to the elements. Prior to connecting dispensing vessel 22 to multi-tap dispensing system 25, a source of nitrogen 50 is connected to vessel 22, and a purge valve contained within dispensing vessel 22 is opened to purge out air containing oxygen. The dispensing vessels 22 are known in the art and provide a standard connection to tubing 35 and integrate into multi-tap dispensing system 25. During the second stage of cooling the beverage contained in vessel 22 is next forced through the stainless steal coils of unit 10, resulting in a beverage with a dispensing temperature of 36 to 40 degrees Fahrenheit. The stainless steel coils of unit 10 are connected to the color-coded tubing outputs 35, that are bundled in non-insulated conduit 30, of multi-tap dispensing system 25. Tubing 35 and the beverages contained therein are routed through unit 10 via stainless steel coils for chilling then exit unit 10 through tubing encased in insulated conduit 40 to the various remotely located dispensing stations 15. An inline circulating chiller comprised of multiple chilling lines are bundled with conduits 35 into insulated conduit 40 to maintain the temperature of beverages delivered to dispensing stations 15. A separate coil in the ice bath is dedicated for the use of chilled water to be delivered to the brewer 20. This line is routed into insulated conduit 45. An inline circulating chiller comprised of multiple chilling lines are bundled with the chilled water line, into insulated conduit 45, to maintain the temperature of cold water delivered to brewer 20.

It is understood that the number of conduits 35 is illustrative only and represents the variety of beverages in multi-tap dispensing system 25. Lines may be added or deleted depending on the number of different flavors of beverages or different types of beverages required and contained in dispensing vessels 22. Furthermore, Dispensing Taps 15 may be added or deleted depending on the number of stations required in any particular application. Multiple lines of color coded tubing 35 carry multiple flavors of coffee or other brewed beverages contained in dispensing vessels 22 to a main conduit 30 which encases tubing 35 while enroute to refrigeration unit 10. Unit 10 reduces the temperature of the beverage that is forced through the tubing 35 from the dispensing vessels 22 to 36–40 degrees Fahrenheit. Upon exiting unit 10, color coded tubing lines 35 are encased in an insulated conduit 40, to maintain a 36–40 degree Fahrenheit temperature while enroute to dispensing stations 15. Multi-tap dispensing system 25 is known in the art and is a common manifold fed multi-tap dispenser. A source of pressurized and regulated nitrogen 50 is connected to color coded tubing 35, via a regulation connection valve 55, delivering the pressurized nitrogen to the dispensing vessels 22, via a connection known in the art such as a gas disconnect, to force beverages through tubing 35 enroute to chilling station 10.

Figure 2:
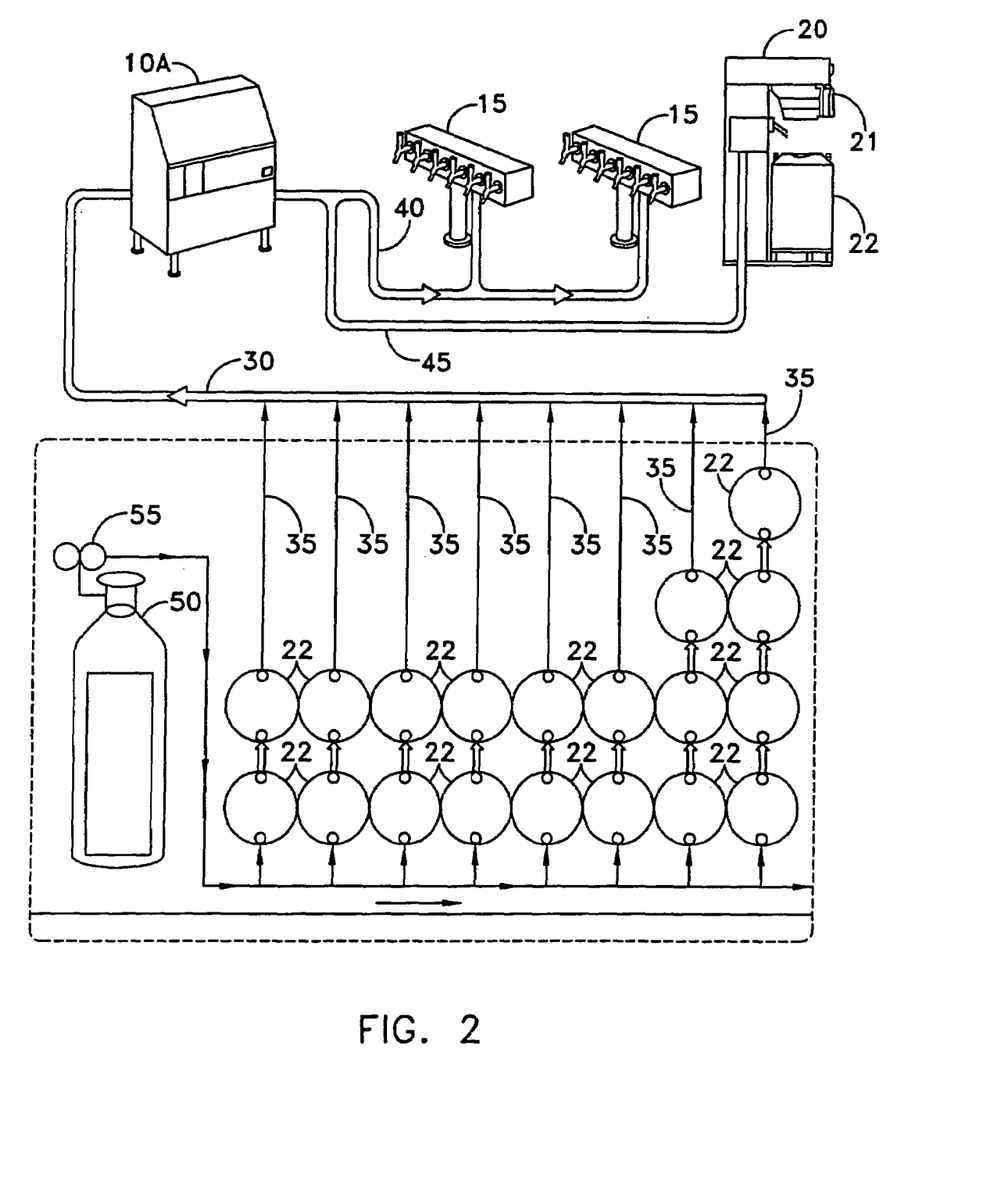
FIG. 2 depicts an embodiment of subject invention utilizing a modified ice machine apparatus for chilling.
Figure 5:
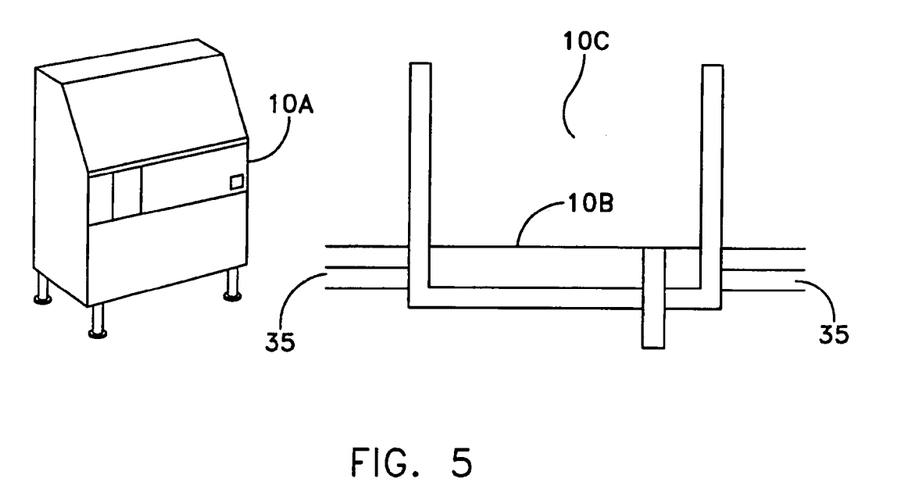
FIG. 5 depicts the components of modified ice machine apparatus of subject invention.

FIG. 2 illustrates another embodiment of subject invention utilizing a conventional ice machine 10A that has been internally modified. Referring to FIG. 5, ice machine 10A has been modified by replacing the bin bottoms with a sealed cold plate 10B. The interior 10C is filled with ice thereby chilling cold plate 10B. Beverage lines 35 exit main conduit 30 and are connected to connection fittings on the bin 10A exterior. These connection fittings allow for beverage lines 35 to be connected to stainless steel chilling coils located within cold plate 10B. The beverage is chilled as it passes through the chilling coils of cold plate 10B. The cold plate can be made from aluminum or other material known in the art that has a high thermal conductivity.

The output beverage lines 35 are coupled to the chilling coil outputs of cold plate 10B through connection fittings and exit ice machine 10A chilled at a temperature of 36–40 degrees Fahrenheit. The beverage lines 35 connected to the output of ice machine 10A are encased in insulated conduit 40, while enroute to dispensing station 15.

Figure 3:
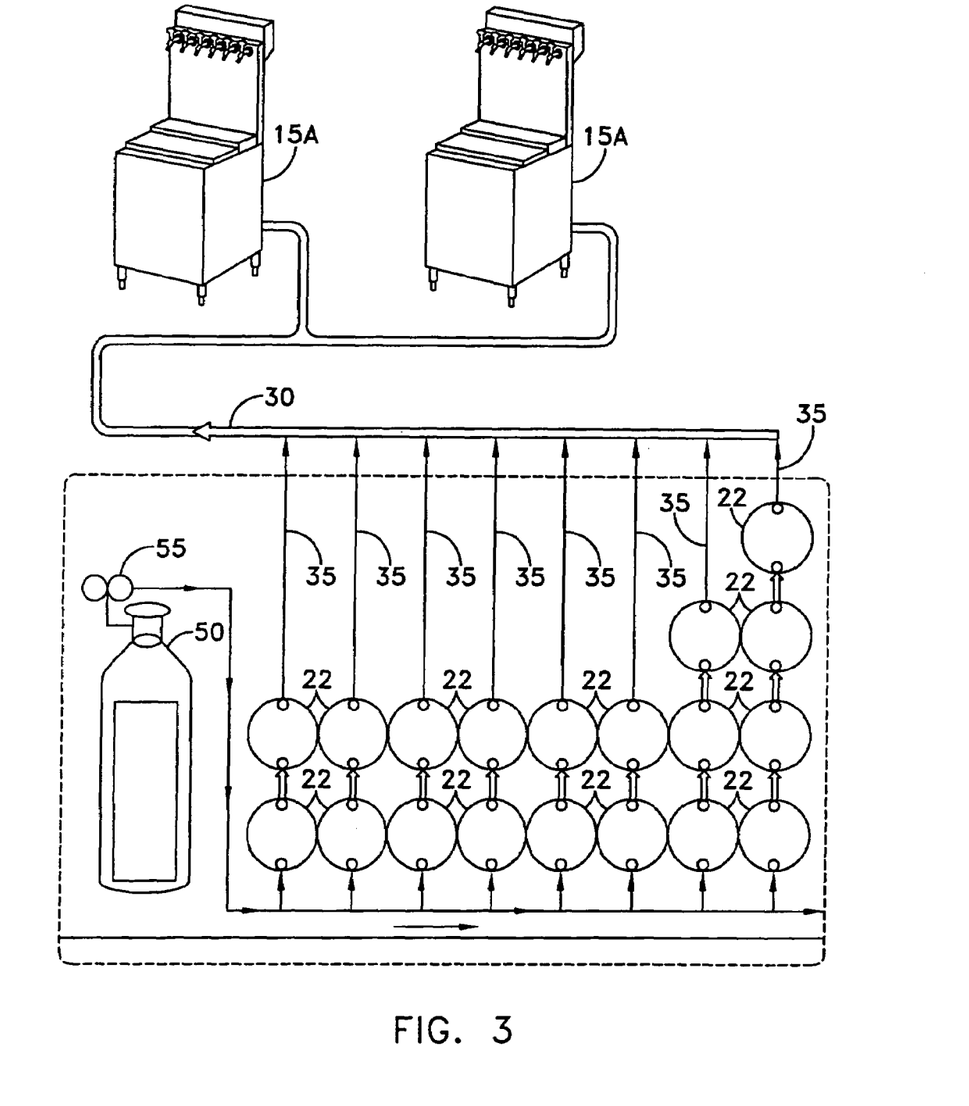
FIG. 3 depicts an embodiment of subject invention utilizing a fountain apparatus for chilling and dispensing.

FIG. 3 illustrates another embodiment of subject invention with an integrated dispensing system 15A comprising a built in ice bin and cold plate for potable ice and beverage cooling. Such dispensing systems 15A are known in the art and are available to accept multiple beverage conduits 35 for beverage cooling and dispensing.

Figure 4:
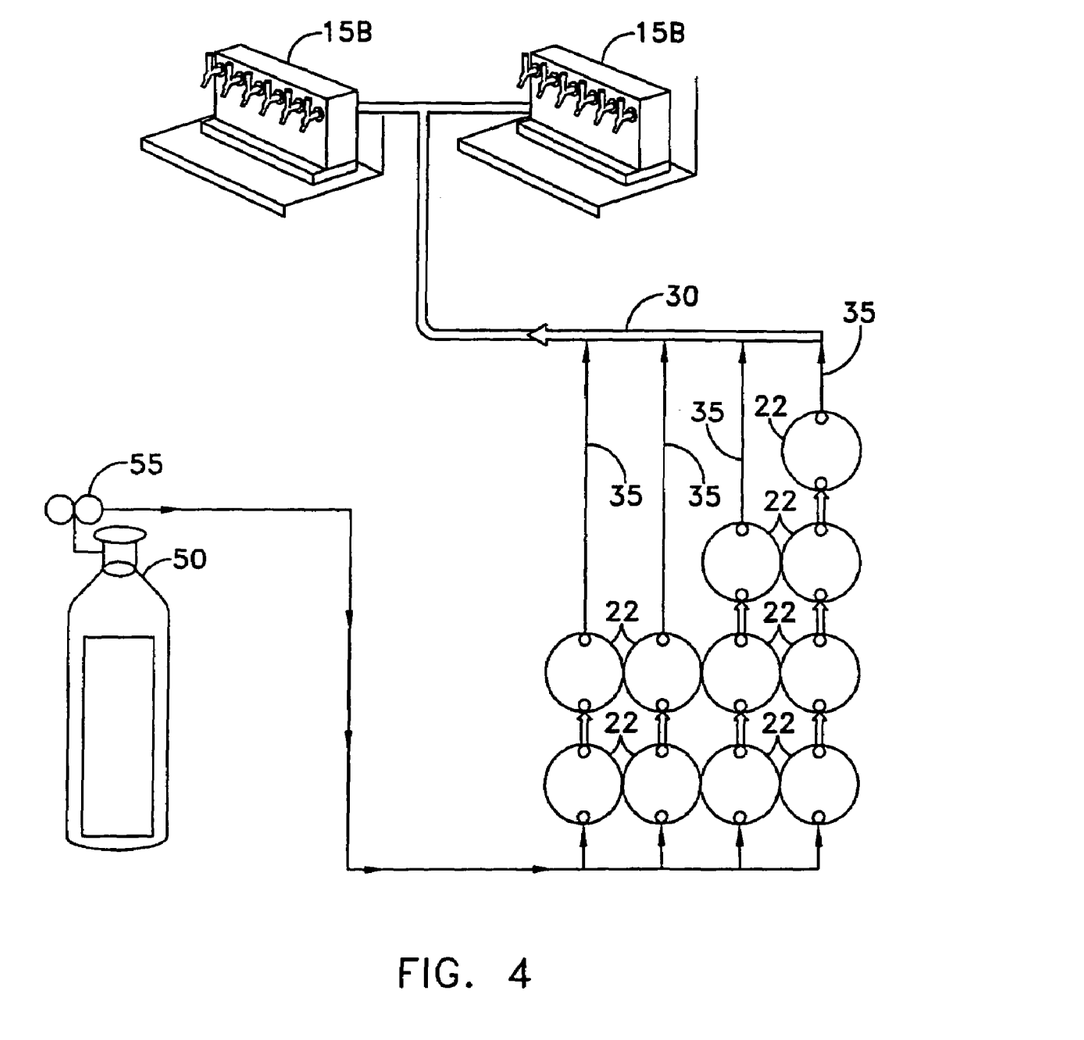
FIG. 4 depicts an embodiment of subject invention utilizing on-counter chilling and dispensing units.
Figure 6:
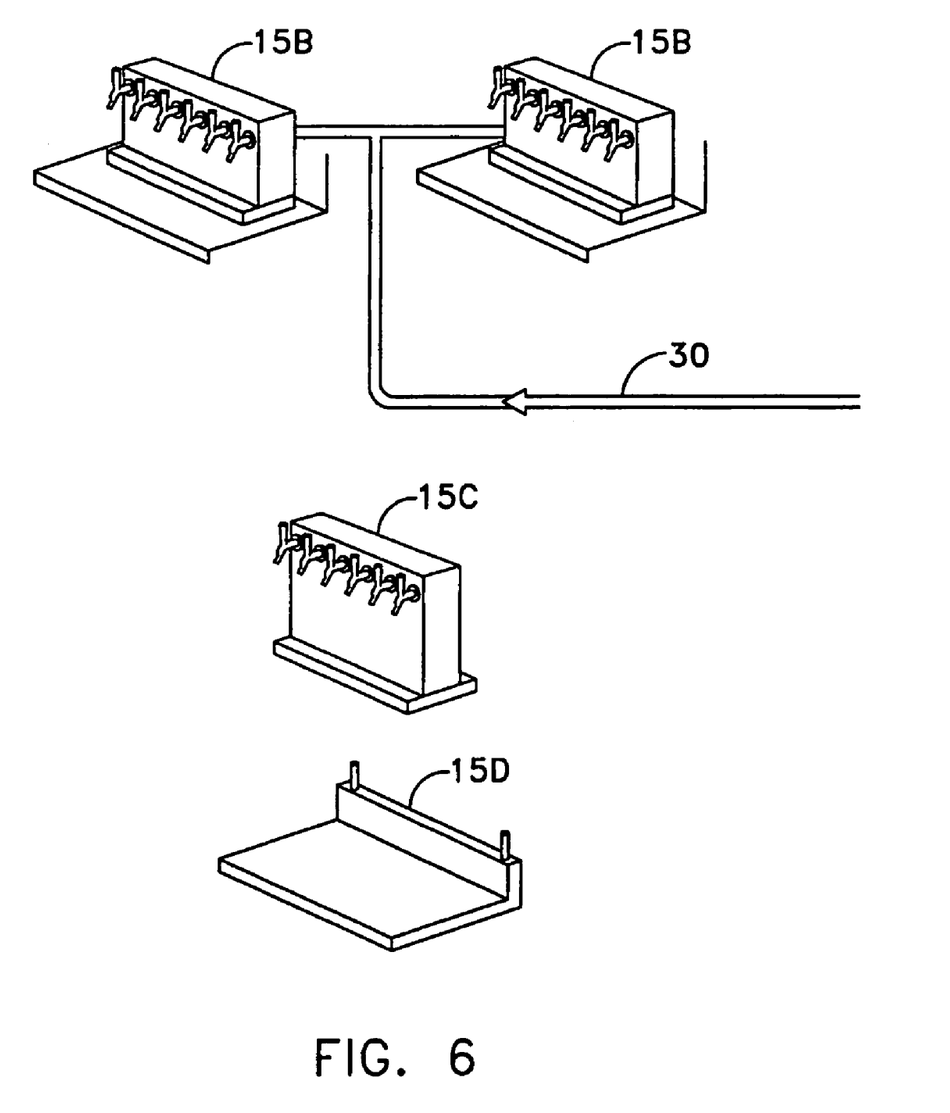
FIG. 6 depicts the components of the on-counter chilling and dispensing units of subject invention.

FIG. 4 illustrates another embodiment of subject invention utilizing a dispensing system 15B. As illustrated in FIG. 6, dispensing system 15B comprises a stainless steel box 15C with cold plate 15D. Cold Plate 15D is adapted to accept color-coded beverage conduits 35 for beverage cooling and dispensing. Prior to beverage dispensing, stainless steel box 15C is filled with ice and chills cold plate 15D thereby chilling conduits 35 and the beverage contained therein. A drain pan and drain discharge is incorporated into dispensing station 15B to contain any overflow while dispensing.

While a number of preferred embodiments of the invention have been disclosed in detail, those of skill in the art will recognize that a number of additional embodiments thereof and improvements thereon are within the scope of the invention.

It is also understood that all references to temperature are approximate and may vary according to desired beverage temperature, environmental factors, and variations due to specific equipment's used to implement invention, without deviating from the scope of the invention.

I claim:

1. A method of producing a cool beverage from a hot beverage without dilution through pouring over ice and without exposure to the atmosphere through storage in open containers, comprising the steps of:
   brewing a hot beverage to form a strong concentrate, said strong concentrate received by a dispensing vessel;
   adding chilled water to said dispensing vessel to form a first cooled beverage, whereby said first cooled beverage has a reduced temperature;
   removing oxygen from said dispensing vessel;
   chilling said first cooled beverage, contained in said dispensing vessel, to form a second cooled beverage, said second cooled beverage at a lower temperature than said first cooled beverage.

2. A method as in claim 1, wherein said step of removing oxygen from said dispensing vessel includes the step of pressurizing said vessel with nitrogen.

3. A method as in claim 1, including after the step of adding chilled water to said dispensing vessel, the step of immediately sealing said dispensing vessel.

4. A method as in claim 1, including after the step of removing oxygen from said dispensing vessel, the step of connecting said dispensing vessel to a multi-tap dispensing system.

5. A method as in claim 1, including after the step of chilling said first cooled beverage, the step of delivering said second cooled beverage to a dispensing station.

6. A method as in claim 1, wherein said reduced temperature of said first cooled beverage is between approximately 70 to approximately 90 degrees Fahrenheit.

7. A method as in claim 1, wherein said second cooled beverage temperature is between approximately 36 to approximately 40 degrees Fahrenheit.

8. A method as in claim 1, wherein said brewing step and said adding chilled water step occur simultaneously.

9. A method as in claim 1, wherein said first cooled beverage and said second cooled beverage is coffee.

10. A method as in claim 1, wherein said first cooled beverage and said second cooled beverage is tea.

\* \* \* \* \*